Figure 2:
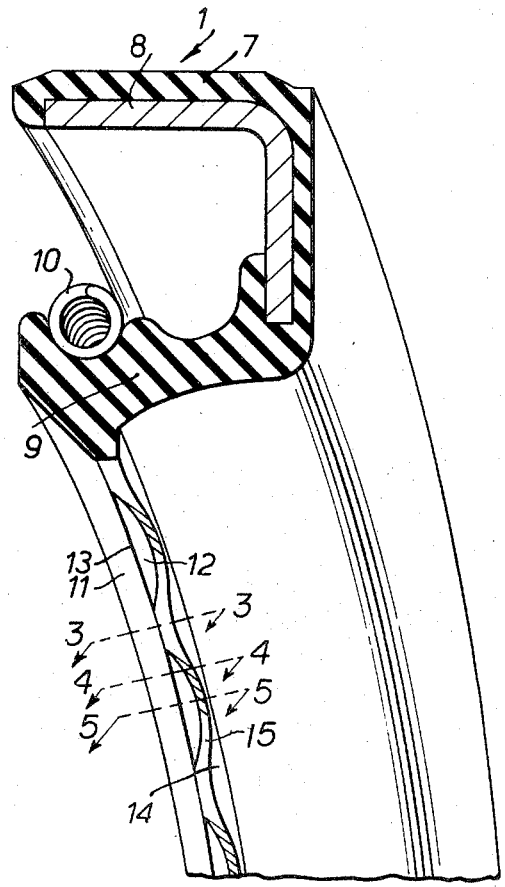

United States Patent [19]
Fern

[11] 3,838,862
[45] Oct. 1, 1974

[54] SEALS FOR USE BETWEEN TWO RELATIVELY-ROTATING SURFACES

[75] Inventor: Alan G. Fern, Hatherley, England

[73] Assignee: Dowty Seals Limited, Gloucestershire, England

[22] Filed: July 20, 1971

[21] Appl. No.: 164,474

Related U.S. Application Data

[63] Continuation of Ser. No. 831,177, June 6, 1969, abandoned.

[30] Foreign Application Priority Data
Oct. 31, 1968  Great Britain ................... 51569/68
Jan. 24, 1969  Great Britain ..................... 4138/69

[52] U.S. Cl. .................................. 277/96, 277/134
[51] Int. Cl. ...................... F16j 15/34, F16j 15/54
[58] Field of Search ......................... 277/134, 96 A

[56] References Cited
UNITED STATES PATENTS
3,504,920   4/1970   Halliday ............................. 277/134
3,515,395   6/1970   Weinand ............................. 277/134
3,523,692   8/1970   Otto .............................. 277/134 X FOREIGN PATENTS OR APPLICATIONS
499,480   1/1939   Great Britain ..................... 277/134

OTHER PUBLICATIONS
Helixseal, by L. H. Weinand, Paper No. 67, WA/-LUB-8, pages 9 and 10, June 7, 1967.

*Primary Examiner*—Samuel B. Rothberg
*Attorney, Agent, or Firm*—Young and Thompson

[57] ABSTRACT

A lip seal for use between two relatively-rotating surfaces, for preventing the leakage of fluid therebetween irrespective of the direction of relative rotation. The seal has projections on the "air" side of the sealing lip (that is to say, the side remote from the fluid to be sealed) which so engage one of the relatively-rotating surfaces as to have a contact area of which two opposite sides extend away from the sealing lip portion and diverge away from each other, and in which the contact pressure increases with distance from the sealing lip.

1 Claim, 9 Drawing Figures

PATENTED OCT 1 1974 3,838,862

INVENTOR
ALAN GREGORY FERN
BY
ATTORNEYS

SEALS FOR USE BETWEEN TWO RELATIVELY-ROTATING SURFACES

This application is a continuation of application Ser. No. 831,177, filed June 6, 1969, and now abandoned.

This invention relates to a seal for use between two relatively-rotating surfaces, for preventing the leakage of fluid therebetween. One such seal is a rotary shaft seal.

It is well known to provide helical grooves or threads adjacent the sealing lip of a rotary shaft seal in order to provide sealing of fluid under dynamic conditions. These have been found to operate reasonably well when the direction of rotation is in one direction only, but have the serious disadvantage of providing a leakage path for the fluid when the direction of rotation is reversed.

It is an object of this invention to provide a seal for use between two relatively-rotating surfaces which not only has a more effective sealing function but also has such sealing function irrespective of the direction of relative rotation.

The invention provides a lip seal for fluids, for use between two relatively-rotatable surfaces, having a surface-engageable sealing lip portion and projections spaced at intervals around the sealing lip portion on the side thereof intended, in use, to be remote from the fluid to be sealed, each projection being adapted to engage the surface engageable by the sealing lip portion with a contact area of which two opposite sides extend away from the lip portion and diverge away from each other so that each side is inclined at an acute angle to the part of the sealing lip portion adjacent thereto. When assembled between two relatively-rotating parts, the force under the projection increases as the axial distance from the sealing lip portion increases.

In the accompanying drawings

Figure 1:
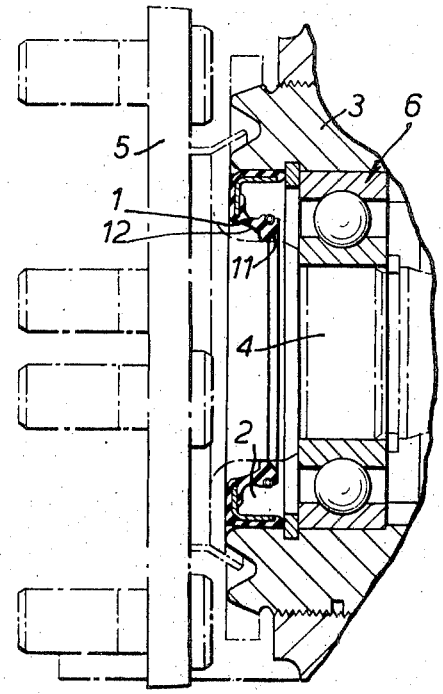
Figure 4:
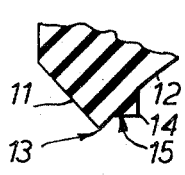
Figure 5:
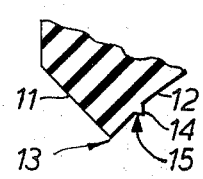
Figure 6:
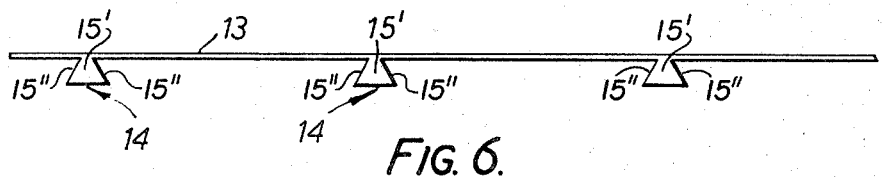
Figure 7:
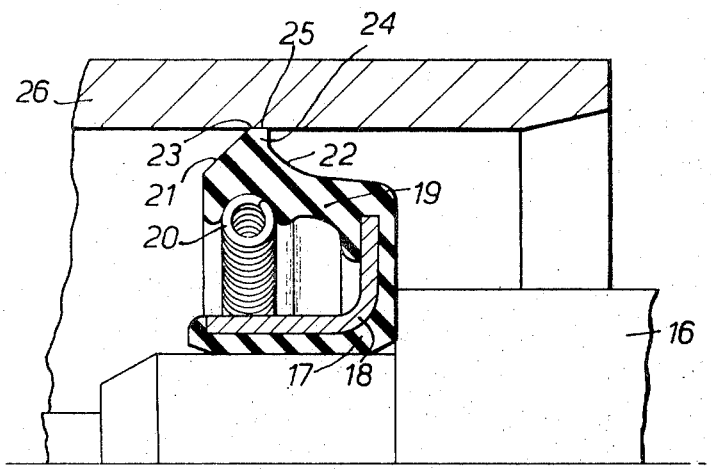

FIG. 1 is a view, partly in section, of a rotary shaft seal, in accordance with an embodiment of the invention, mounted in sealing relationship with the shaft of an automobile gear box, FIG. 2 is a perspective view of part of the rotary shaft seal shown in FIG. 1, FIGS. 3, 4 and 5 show the cross section of the sealing ring in radial planes containing the lines 3 — 3, 4 — 4 and 5 — 5 respectively, of FIG. 2, FIG. 6 is a developed view of the contact area of the seal with the shaft, FIG. 7 is a sectional view of part of another rotary shaft seal in accordance with an embodiment of the invention.

Figure 8:
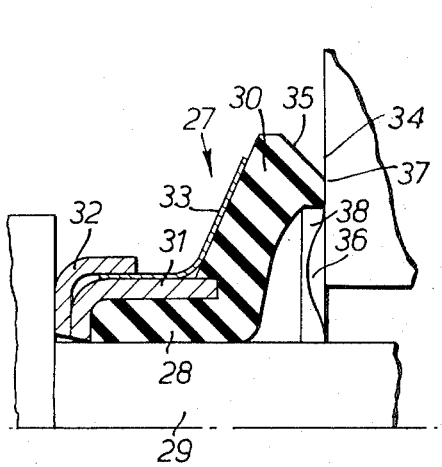
Figure 9:
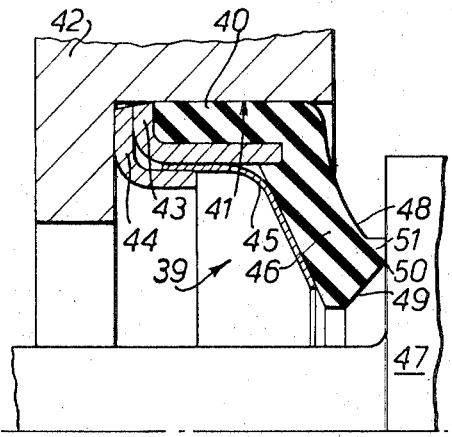

FIG. 8 is a sectional view of part of an axial face seal, in accordance with an embodiment of the invention, and FIG. 9 is a sectional view of part of another axial face seal, in accordance with an embodiment of the invention.

Referring to FIGS. 1 to 5 of the drawings, the rotary shaft seal 1 is mounted in a housing 2 formed at one end of a gear box casing 3. A shaft 4 projects from the gear box casing and has a suitable means 5 for connecting it to a device to be driven by the shaft. The shaft 4 is supported in the gear box casing by a bearing 6. The seal 1 seals the space between the shaft and that wall of the housing which is parallel to the axis of the shaft, so as to prevent leakage of liquid from the gear box to the exterior thereof.

Referring more particularly to FIGS. 2 to 5, the seal 1, which is described merely to show one example of a seal in accordance with the invention is of generally annular construction, is conveniently moulded to shape, and is made from any suitable sealing material such as rubber or a rubber-like material. It comprises a static sealing portion formed as an outer holding annulus 7 which is stiffened by an inserted metal ring 8, and an inner flexible flange 9. A garter spring 10 embraces the flange 9.

The inner flexible flange 9 has an outer end portion formed with two surfaces 11 and 12 each of which is inclined at an angle to the axis of the seal so as to meet the other and define a sealing lip 13.

As can be seen in FIG. 1, the surface 11 lies in use, adjacent to the liquid to be sealed. The surface 11 is, therefore, on the "oil" side of the seal and the surface 12 is, therefore, on the "air" side of the seal.

Figure 3:
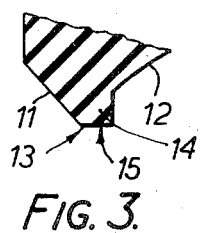

Surface 12 has thereon and spaced therearound a plurality of projecting parts which join together to form an integral projection 14 with an undulating side wall 15. This side wall 15 is substantially parallel to the axis of the seal in its free state as moulded and the distance of this side wall 15 from the axis of the seal varies cyclically around the surface 12 having its minimum distance equal to the radius of the lip 13. As seen in FIGS. 3, 4 and 5 the axial length of the side wall 15 varies from a maximum at the lip 13 to a minimum (which may be zero) at its points most remote from the lip 13.

When the seal is fitted in a housing and engages with a shaft, as shown in FIG. 1, the engagement with the shaft will be an interference fit. The contact area of the sealing lip portion 13 with the shaft will be thin and continuous, and the contact area of the projection 14 with the shaft will be a number of spaced-apart contact areas 15' (see FIG. 6). Each such contact area 15' has two opposite sides 15'' which extend away from the lip portion and diverge away from each other. Thus each of the opposite sides 15'' is inclined at an acute angle to the part of the sealing lip portion which is adjacent thereto. Under static conditions, the force under the projection on the shaft increases as the distance from the sealing lip portion, at right angles thereto, increases, substantially up to the outer edge of the contact area.

In operation, any fluid which leaks past the lip to the air side thereof will be carried around by the rotating shaft. When it approaches one side 15'' of the contact arm of the projection, the liquid by reason of the shape of the contact area, will be moved towards the seal lip, building up as a wedge-shaped pocket of liquid. Due to the rotation of the shaft, pressure will be developed in the wedge-shaped pocket of liquid. This pressure will overcome the contact pressure between the lip 13 and the part of the projection adjacent the lip 13 on the one hand, and the shaft 4 on the other hand. However, the force under the projection increases as the axial distance from the lip 13 increases and thus the leakage liquid will undergo a dynamic pumping action and will tend to be forced back under the lip to the oil side thereof. The formation of the wedge-shaped pocket is aided by the side wall 15 which converges towards the surface of the shaft in the region of the side of the contact area. Any residual film of liquid not forced back under the lip 13, will be carried round by the shaft to the next wedge-shaped pocket.

This dynamic pumping effect will be obtained irrespective of the direction of rotation of a shaft because of the two opposite diverging sides 15'' of the surface contact area 15' of the projection with a shaft. Furthermore, efficient sealing will be provided even when the shaft is stationary because the engagement of the sealing lip portion with the shaft is continuous.

In use of the shaft seal just described with reference to the drawings, there will be a continuous circulation of liquid under the sealing lip portion and under a substantial part of each projection in contact with the shaft. This circulation of liquid will not only tend to act as a lubricant and prevent undue wear of the sealing lip portion and a part of the projection, but will also tend to act to cool the sealing lip portion and the projection.

The seal shown in FIGS. 1 to 6 has a lip which engages a rotating surface during operation, and the sealing lip is located internally of the seal. FIG. 7 shows a seal which rotates with a shaft 16 during operation.

The seal comprises an inner holding annulus 17 which is stiffened by an inserted metal ring 18, and an outer flexible flange 19. An endless spring 20 is associated with the flange 19. The outer flexible flange 19 has two surfaces 21 and 22, each of which are inclined at an angle to the axis of the seal so as to meet and define a sealing lip 23.

The surface 22 has thereon an integral projection 24, with a side wall 25, which is similar to the projection 14 shown in FIGS. 2 to 5, except that the distance of the side wall 25 from the axis of the seal is at a maximum at the lip 23.

The sealing lip 23 and the projection 14 are circumferentially compressed upon assembly within the stationary housing surface 26.

The operation of the seal is the same as that described with reference to FIGS. 1 to 6.

In FIG. 8 there is shown an axial face seal in accordance with an embodiment of the invention.

This axial face seal 27 of FIG. 8 has a holding annulus 28 which fits on a rotatable shaft 29, and a flexible flange 30. The annulus 28 is stiffened by two cup-shaped washer-like pressings 31, 32 between which is held a spring member 33. The cup-shaped pressing 31 is an interference fit on the annulus 28 and the cup-shaped pressing 32 is an interference fit on the spring member 33. The spring member 33 urges the flange 30 against a static surface 34 of a housing.

The outer end portion of the flexible flange 30 has two surfaces 35 and 36 which are inclined at an angle to each other and meet to form a sealing lip 37. The surface 36 has an integral projection 38 which is similar to the projections 14 and 24 of the two previously-described embodiments. Thus, when the sealing ring is in its free state as moulded, the generating surface of each projection is substantially parallel to the static surface 34 and transverse to the central axis of the shaft.

FIG. 9 shows an axial face seal in accordance with another embodiment of the invention. This axial face seal 39 has a holding annulus 40 which fits on the surface 41 of a stationary housing 42. The annulus 40 is stiffened by two cup-shaped washer-like pressings 43, 44 between which is held a spring member 45. The cup-shaped pressing 43 is an interference fit on the surface 41 and the cup-shaped pressing 44 is an interference fit on the spring member 45. The spring-member 45 urges the flange 46 against a surface of a rotatable member 47.

The outer end portion of the flexible flange 46 has two surfaces 48 and 49 which are inclined at an angle to each other and meet to form a sealing lip 50. The surface 48 has an integral projection 51 which is similar to the projections 14, 24 and 38 of the three previously described embodiments and which is arranged to provide a contact area in a manner similar to that previously described.

In the embodiments of the invention described with reference to the drawings, each contact area 15 is formed by simple continuous projection on the inclined surface 12. Such a continuous projection is not essential. A number of spaced-apart discrete projections, each providing one or more contact areas, similar to a contact area 15, could be formed integrally on the inclined surface which in use of the seal is remote from the fluid to be sealed.

Lip seals for fluids in accordance with this invention may readily be designed to give an optimum or required pumping action by suitable choice of the length (in a direction at right angles to the sealing lip portion) of the contact surface of the projection with a shaft or other member and/or by suitable choice of the wedge angles.

With a lip seal for fluids in accordance with this invention intended for use as a shaft seal, a greater degree of lack of concentricity between the shaft axis and the housing axis can be tolerated than heretofor.

A seal in accordance with the invention can be split into two or more parts which abut against each other to form the seal.

Having described my invention, I claim:

1. A seal for retaining liquid between two relatively rotatable members irrespective of the direction of rotation, of which one member has a seal housing and the other member has a surface transverse to the rotational axis to be engaged by the seal, comprising a sealing ring having a static sealing portion mounted in the seal housing, a flexible flange extending from the static sealing portion, generally in the direction in which the said transverse surface extends and towards the liquid to be sealed, to an outer end portion of the sealing ring, two mutually inclined surfaces on said outer end portion defining a circular sealing lip, and a plurality of circumferentially spaced projections raised on that inclined surface which is the closer of the two inclined surfaces to the static sealing portion and which is remote from the liquid, each projection having a surface which is generated by movement, about the central axis of the ring, of a line which is substantially perpendicular to the said central axis and which at one position is contiguous with the sealing lip and which, on opposite sides of said one position recedes from the sealing lip, the sealing lip and the portion of the said surface of each projection which is contiguous with the sealing lip engaging the said transverse surface with an interference fit, whereby upon assembly of the sealing ring between said members, the flange is deflected from its free state, about the static portion, the part of the surface of each projection in the vicinity of that part which is contiguous with the lip consequently engaging the said transverse surface over an area having opposite sides which extend away from the sealing lip and which diverge away from each other and with a pressure which increases as the distance from the sealing lip in a direction at right angles to the plane of the sealing lip increases.

* * * * *